US005149996A

United States Patent [19]

Preston et al.

[11] Patent Number: 5,149,996

[45] Date of Patent: Sep. 22, 1992

[54] MAGNETIC GAIN ADJUSTMENT FOR AXIALLY MAGNETIZED LINEAR FORCE MOTOR WITH OUTWARDLY SURFACED ARMATURE

[75] Inventors: Mark A. Preston, South Hadley, Mass.; Frederick W. Stingle, Simsbury, Conn.

[73] Assignee: United Technologies Corporation, Hartford, Conn.

[21] Appl. No.: 474,960

[22] Filed: Feb. 5, 1990

[51] Int. Cl.[5] .................... H02K 41/02; H02K 35/06

[52] U.S. Cl. .................... 310/12; 310/36; 310/191; 318/135

[58] Field of Search .................... 310/12, 14, 15, 23, 310/29, 30, 13, 190, 191, 19, 36; 318/122, 123, 124, 135

[56] References Cited

U.S. PATENT DOCUMENTS

| | | | |
|---|---|---|---|
| 2,128,044 | 8/1938 | Grabner | 310/191 |
| 2,610,993 | 9/1952 | Stark | 310/191 |
| 3,202,886 | 8/1965 | Kramer | 310/14 |
| 3,460,081 | 8/1969 | Tillman | 335/234 |
| 3,634,734 | 1/1972 | Komatsu | 317/154 |
| 3,728,654 | 4/1973 | Tada | 335/234 |
| 4,127,835 | 11/1978 | Knutson | 335/266 |
| 4,144,514 | 3/1979 | Rinde et al. | 335/229 |
| 4,235,153 | 11/1980 | Rinde et al. | 91/1 |
| 4,533,890 | 8/1985 | Patel | 335/234 |
| 4,631,430 | 12/1986 | Aubrecht | 310/12 |
| 4,710,656 | 12/1987 | Studer | 310/51 |
| 4,827,163 | 5/1989 | Bhate et al. | 310/15 |
| 4,831,292 | 5/1989 | Berry | 310/15 |
| 4,899,074 | 2/1990 | West | 310/154 |
| 4,924,123 | 5/1990 | Hamajima et al. | 310/15 |
| 4,928,028 | 5/1990 | Leibovich | 310/23 |

OTHER PUBLICATIONS

Direct-Drive Servovalve Activities at Moog by W. J. Thayer presented at SAE A-60 Meeting, Long Beach, Calif., Oct. 7, 1983.

Characteristics and Optimal Design of Variable Airgap Liner Force Motors by M. C. Leu et al. from IEE Proceedings, vol. 135, No. 6, Nov. 1988.

*Primary Examiner*—Steven L. Stephan
*Assistant Examiner*—Dennis R. Haszko
*Attorney, Agent, or Firm*—Donald W. Muirhead; O'Shea Patrick J.

[57] ABSTRACT

An axially magnetized linear force motor employs an exteriorly faced armature (4) having a first exterior face (14) and a second exterior face (16), wherein said first face (14) is acted upon by a first axial magnetic field established by a first annular, axially polarized, permanent magnet (22) and said second face (16) is acted upon by a second axial, magnetically opposing, magnetic field established by a second annular, axially polarized, permanent magnet (26). Actuation of a coil (32) affects the first and second fields oppositely causing an imbalance of net magnetic forces. The force imbalance causes the armature (4) to displace to a point where the net magnetic force equals a counter force established by a spring (10). Positionable ferromagnetic slugs (36, 37) alter the ratio of displacement of the armature (4) to the magnitude of a signal used to actuate the coil (32).

9 Claims, 1 Drawing Sheet

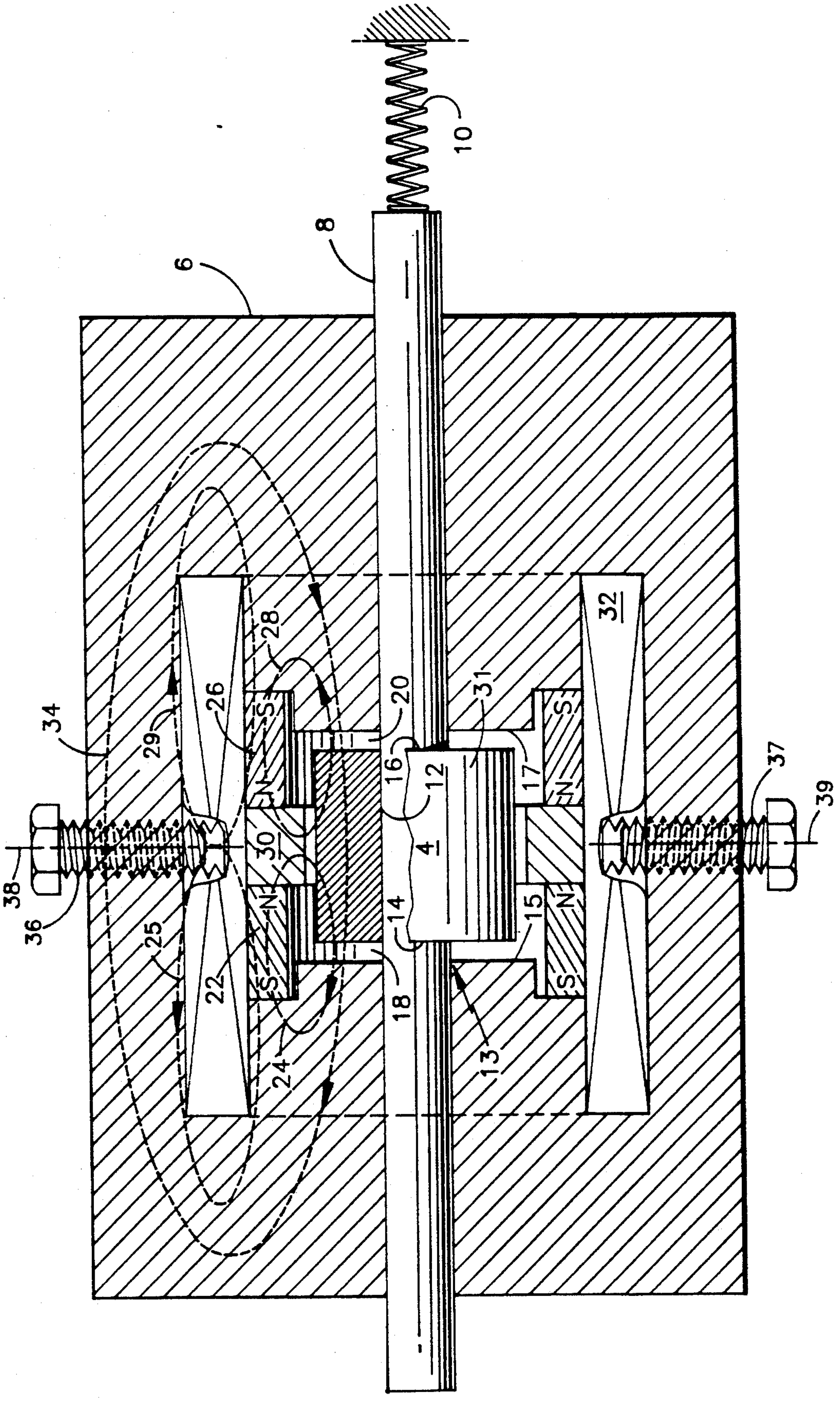
10
8
6
32
28
31
20
26
34
29
16
12
17
37
39
4
30
38
36
14
15
25
22
18
24
13
S
N

MAGNETIC GAIN ADJUSTMENT FOR AXIALLY MAGNETIZED LINEAR FORCE MOTOR WITH OUTWARDLY SURFACED ARMATURE

TECHNICAL FIELD

This invention relates to the field of electrical motive power systems and more particularly to the field of linear-movement motors.

BACKGROUND ART

It is known that an axially magnetized linear force motor with an outwardly surfaced armature (hereinafter referred to generically as a linear force motor) linearly displaces the armature proportional to the magnitude of the driving current. The displacement of the armature of a linear force motor is linearly proportional to the magnitude of an input signal (for example a current input signal) supplied to the motor. The ratio of the displacement of the armature to the magnitude of the input signal is call the "gain" of the motor. Examples of linear force motors are generally disclosed in U.S. Pat. Nos. 4,235,153 and 4,127,835.

One difficulty with the linear force motor is that the gain can vary from motor to motor because part dimensions, magnet strengths, etc. vary from motor to motor. The variation of the gain is unacceptable for some applications.

The gain of a linear force motor can be controlled by machining the parts of the motor. However, setting the gain to a particular value by machining the parts requires assembling the motor, measuring the gain, disassembling the motor, and machining the parts repeatedly until the desired gain has been attained. This process is time consuming and adds to the manufacturing cost of the linear force motor.

The variations in gain between linear force motors can also be minimized by initially manufacturing the parts of the motors to exacting tolerances. However, the cost of a part is inversely proportional to the allowable variation of the part. Therefore, manufacturing the parts of the linear force motor to exacting tolerances will increase the cost of the linear force motor.

DISCLOSURE OF INVENTION

Objects of the invention include practical, cost-effective provision for adjusting the gain of a linear force motor.

According to the present invention, ferromagnetic slugs are variably positioned along radial axes within magnetic fields of a linear force motor, whereby adjusting the radial positions of said slugs alters the gain of said linear force motor.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

The sole FIGURE is a sectioned schematic of an axially magnetized linear force motor with an outwardly surfaced armature having provision for gain adjustment according to the invention.

BEST MODE FOR CARRYING OUT THE INVENTION

Referring to the FIGURE, a linear force motor is comprised of an annular, ferromagnetic, exteriorly faced armature 4, a ferromagnetic housing 6, a nonmagnetic shaft 8, and a spring 10. The armature 4 is disposed radially outward of the shaft 8. The radially innermost portion of the armature 4 forms a surface 12. The shaft 8 is fixedly attached to the surface 12 by any well known means to form an armature assembly 13. The shaft 8 is mechanically coupled to an external device (not shown) which is to be driven by the linear force motor.

The housing 6 and the armature assembly 13 cooperate to displace the armature assembly 13 in an axial direction (i.e. in a direction coincident with the central axis of the armature assembly 13). The spring 10 is fixedly attached to the armature assembly 13 by any well know means so that displacement of the armature assembly 13 causes the spring 10 to exert a force which opposes the direction of displacement. The spring 10 exerts a force either by extension or compression depending upon the position of the armature assembly 13 within the housing 6. The magnitude of the force of the spring 10 is linearly proportional to displacement of the armature assembly 13 within the housing 6.

The armature 4 has a first armature face 14 which is parallel to and opposed by a first housing face 15. Similarly, the armature 4 has a second armature face 16 which is parallel to and opposed by a second housing face 17. The maximum displacement of the armature assembly 13 in one direction occurs when the first armature face 14 comes in contact with the first housing face 15. The maximum displacement of the armature assembly 13 in the other direction occurs when the second armature face 16 comes in contact with the second housing face 17. When the distance between the first faces 14,15 is equal to the distance between the second faces 16,17, the spring 10 is between its extension and compression phases and exerts no force on the armature assembly 13.

A first gap 18 exists between the first armature face 14 and the first housing face 15. In this embodiment, the gap 18 contains air. Similarly, a second gap 20, containing air, exists between the second armature face 16 and the second housing face 17. As the armature assembly 13 is displaced, the lengths of the gaps 18,20 (i.e. the distance between the first faces 14, 15 and the distance between the second faces 16, 17) changes. The change in length of the gap 18 is always equal and opposite to the change in length of the gap 20.

A first annular, axially polarized (i.e. magnetically polarized along lines which are parallel to the axis of displacement), permanent magnet 22 establishes a first magnetic field which acts on the armature 4. A flux path 24, which illustrates the path of magnetic flux emanating from the first magnet 22, extends from the first magnet 22 in a clockwise direction. The magnet 22 also establishes a first leakage magnetic field which is illustrated by a flux path 25.

A second annular, axially polarized, permanent magnet 26 establishes a second magnetic field which acts on the armature 4. A flux path 28, which illustrates the path of magnetic flux emanating from the second magnet 26, extends from the second magnet 26 in a counterclockwise direction. The magnet 26 also establishes a second leakage magnetic field which is illustrated by a flux path 29.

An annular, ferromagnetic flux conductor 30 causes the majority of the magnetic flux established by the magnets 22, 26 to pass through the annuluses of the magnets 22, 26 along the paths 24, 28 rather than around the outward most portions of the magnets 22,26 along the paths 25, 29.

The path 24 extends from the magnet 22, through the flux conductor 30, into the armature 4 via a surface 31, out of the armature 4 via the face 14, through the gap 18, through the housing 6, and back to the magnet 22. Similarly, the path 28 extends from the magnet 26, through the flux conductor 30, into the armature 4 via the surface 31, out of the armature 4 via the face 16, through the gap 20 through the housing 6, and back to the magnet 26.

The faces 14, 16 and the surface 31 comprise all of the critical surfaces (i.e. surfaces through which flux which substantially contributes to motion of the armature 4 passes) of the armature 4. Since all of the critical surfaces face outwardly from the armature 4, the armature 4 is an outwardly surfaced armature. Note that no flux which substantially contributes to motion of the armature 4 passes through the inwardly facing surface 12 of the armature 4.

The amount ($\phi1$) of flux established at the face 14 attributable to the magnet 22 is a function of the magnetomotive force (mmf), M1, of the permanent magnet 22 and the combined effect of the magnetic reluctances along the path 24 and the path 25. Increasing the magnetic reluctances along the path 25 will increase $\phi1$ while decreasing the reluctance along the path 25 will decrease $\phi1$.

Similarly, the amount ($\phi2$) of flux established at the face 16 attributable to the magnet 26 is a function of the mmf, M2, of the permanent magnet 26 and the combined effect of the magnetic reluctances along the path 28 and the path 29. Increasing the magnetic reluctances along the path 29 will increase $\phi2$ while decreasing the reluctance along the path 29 will decrease $\phi2$.

Two positionable ferromagnetic slugs 36, 37 have threads (not shown) which mate with complementary threads (not shown) in the housing 6 in order to provide for variable positioning of the slugs 36, 37 along radial axes 38, 39. The linear force motor has four more slugs (not shown) which are located symmetrically about the circumference of the motor. The slugs 36, 37 are positioned further into the housing 6 (along the axes 38, 39) by rotation in one direction and the slugs 36, 37 are positioned further out of the housing 6 and the coil 32 (along the axes 38, 39) by rotation in the opposite direction. Positioning the slugs 36, 37 further into the housing 6 decreases the reluctance along the paths 25, 29, thereby decreasing the flux at the face 14, 16 of the armature 4. Similarly, positioning the slugs 36, 37 further out of the housing 6 increases the reluctance along the paths 25, 29, thereby increasing the flux at the face 14, 16 of the armature 4.

A hollow, cylindrical coil 32 establishes a third magnetic field which is illustrated by a flux path 34 which extends in a clockwise direction through the annulus and around the outward most portion of the coil 32. The amount ($\phi C$) of magnetic flux established by the coil 32 is a function of the magnitude of current supplied to the coil 32 by an external source of current (not shown) and of the reluctance along the path 34.

At the face 14, a portion of the path 34 coincides with a portion of the path 24. Furthermore, the direction of both paths 24, 34 along the common portions of the paths 24, 34 is the same. Therefore, the total amount of magnetic flux which exists at the face 14 is $\phi1+\phi C$. Similarly, at the face 16 a portion of the flux path 34 coincides with a portion of the flux path 28. However, in this case the direction of the path 34 is the opposite of the direction of the path 28 along the common portions. Therefore, the total amount of flux which exists at the face 16 is $\phi2-\phi C$.

The magnetic flux acting on the face 14 establishes a magnetic force which acts on the armature 4. The magnitude (F1) of the force is a function of the amount ($\phi1+\phi C$) of magnetic flux acting on the face 14. Similarly, the magnetic flux acting on the face 16 establishes another magnetic force on the armature 4, the magnitude (F2) of which is a function of amount ($\phi2-\phi C$) of magnetic flux acting on the face 16.

The spring 10 establishes a counter force to the net magnetic force acting on the armature 4. The magnitude (FS) of the counter force of the spring 10 is linearly proportional to the displacement of the armature 4. At steady state, the armature 4 comes to rest at a displacement where the total magnetic force acting on the armature 4 equals the counter force of the spring 10. Therefore, an equation (EQ. 1) can be written:

$$F1-F2=FS$$

Magnetic force is proportional to the square of the amount of magnetic flux. Therefore, F1, the magnetic force acting on the face 14 equals:

$$K1\times(\phi1+\phi C)^2.$$

Similarly, the magnetic force acting on the face 16 equals:

$$K1\times(\phi2-\phi C)^2.$$

K1 is a constant which depends on a variety of functional factors as known to those skilled in the art.

The counter force provided by the spring 10 is proportional to the displacement, D, of the spring 10. Therefore:

$$FS=K2\times D$$

where K2 is the spring constant.

Using the above substitutions for F1, F2, and FS in EQ. 1 yields:

$$K1\times(\phi1+\phi C)^2-K1\times(\phi2-\phi C)^2=K2\times D$$

Doing the square operations and cancelling terms yields another equation (EQ. 2):

$$K1\times(\phi1^2\phi2^2+2\times\phi C\times(\phi1+\phi2))=K2\times D$$

The amount of flux at the face 14 attributable to the magnet 22, $\phi1$, is equal to the mmf (M1) of the magnet 22 divided by the amount (R1) of reluctance experienced by the magnet 22 along the paths 24, 25. The reluctance of the housing 6, the magnet 22, the flux director 30, and the armature 4 remain constant. The reluctance of the gap 18 changes as the length of the gap 18 (and hence the displacement, D, of the spring 10) changes.

The exact effect of the position (P) of the slugs 36, 37 along the axes 38, 39 depends upon a variety of functional factors. Therefore, the generic function fn(P), where n is a number used to distinguish different instances of the function, is used to describe the effect of the position of the slugs 36, 37 on R1. So:

$$R1=K3\times f1(P)+K4\times D\times f2(P)$$

The term $K3\times f1(P)$ is dependant upon the reluctances of the housing 6 and the flux director 30, the magnet 22, the position of the slugs 36, 37, and the reluctance of the portion of the air gap 18 which exists when D, the displacement of the spring 10, equals zero. The second term, $K4\times D\times f2(P)$, is also dependant upon the change in length of the gap 18.

Having an expression for R1 allows an equation to be written for $\phi1$:

$$\phi1=M1/(K3\times f1(P)+K4\times D\times f2(P))$$

This equation illustrates that the amount of flux, $\phi1$, at the face 14 from the magnet 22 varies as the position, P, of the slugs 36, 37 changes and as the armature 4 displaces and the length of the gap 18 changes.

The term $M1/(K3\times f1(P)+K4\times D\times f2(P))$ can be expanded into a Taylor Series so that the displacement, D, is in the numerator exclusively for all of the terms. However, for a relatively small value of displacement, D, the 3rd and subsequent terms of the series (i.e. the D2, D3, D4, etc. terms of the series) are relative small and hence can be eliminated. Furthermore, M1 is a constant. Therefore, an equation (EQ. 3) can be written:

$$\phi1=K5\times f4(P)+K6\times D\times f5(P)$$

Similarly, another equation (EQ. 4) for the flux at the face 16 attributable to the magnet 26 can be written:

$$\phi2=K7\times f6(P)-K8\times D\times f7(P)$$

EQ. 2 contains the expression $(\phi1^2-\phi2^2)$ on the right hand side of the equation. For EQ. 2 to describe a linear force motor, however, D must be linear proportional to $\phi C$ and therefore there can be no D2 terms in the resulting equation when the expressions from EQ. 3 and EQ. 4 are used to replace $\phi1$ and $\phi2$ in EQ. 2.

However, employing the substitutions for $\phi1$ and $\phi2$ from EQ. 3 and EQ. 4 creates terms in EQ. 2 unless $K6\times f6(P)=K8\times f6(P)$. $K6\times f4(P)$ must equal $K8\times f6(P)$ for a linear relationship between $\phi C$ and D to exist.

The value of P ranges from 0 (i.e. the slugs 36, 37 are positioned as close to the flux conductor 30 as possible) to $\infty$ (i.e. the slugs 36, 37 are removed). As P approaches $\infty$, fn(P) approaches one. This indicates that, when removed, the slugs 36, 37 have no effect on the operation of the linear force motor. Since $K6\times f4(P)$ equals $K8\times f6(P)$, and since at P equals $\infty$, f4(P) equals f6(P) equals one, and since K6 and K8 are constants, then f4(P) must equal f6(P). Therefore, for linearity to exist, K6 must equal K8.

The constant K6 represents the amount that $\phi1$ changes with respect to changes in displacement, D. Therefore:

$$K6=\delta\phi1/\delta D$$

Similarly, the constant K8 represents the amount $\phi2$ changes with respect to changes in the displacement, D. Therefore:

$$K8=\delta\phi2/\delta D$$

Since K8 must equal K6 in order to establish a linear relationship between $\phi C$ and D in EQ. 2, the following must be true:

$$\delta\phi1/\delta D=\delta\phi2/\delta D$$

Assume that the armature 4 displaces a very small amount from position A to position B. An equation for $\delta\phi1$ can be written:

$$\delta\phi1=M1/R1A-M1/R1B$$

where M1 is the mmf of the magnet 22, R1A is the reluctance along the paths 24, 25 when the armature 4 is at position A and R1B is the reluctance along the paths 24, 25 when the armature 4 is at position B. The change in flux, $\delta\phi1$, is the difference between the flux at position A, M1/R1A, and the flux at position B, M1/R1B.

Similarly, $$\delta\phi2=M2/R2A-M2/R2B$$

where M2 is the mmf of the magnet 26, R2A is the reluctance along the paths 28, 29 when the armature 4 is at position A and R2B is the reluctance along the paths 28, 29 when the armature 4 is at position B.

Therefore:

$$M1/R1A-M1/R1B=M2/R2A-M2/R2B$$

Giving each side a common denominator yields an equation (EQ. 5):

$$(M1\times(R1B-R1A))/(R1B\times R1A)=(M2\times(R2B--R2A))/(R2B\times R2A)$$

The terms (R1B−R1A) and (R2B−R2A) represent the change in reluctance attributable to changing the length of the gaps 18,20. Furthermore, both gaps 18,20 contain the same material, air, and the magnitude of the length change of the gap 18 equals the magnitude of the length change of the gap 20.

Therefore:

$$R1B-R1A=R2B-R2A$$

and EQ. 5 can be rewritten as:

$$M1/(R1A\times R1B)=M2/(R2A\times R2B)$$

Furthermore, for very small changes in displacement:

$$R1A\times R1B=R1^2$$

and $$R2A\times R2B=R2^2$$

Therefore, for displacement of the armature 4 to be linearly proportional to the magnitude ($\phi C$) of magnetic flux emanating from the coil 32, the following equation (EQ. 6) must be true:

$$M1/M2=R1^2/R2^2$$

This equation illustrates that for linearity to exist, the ratio of the mmf of the first magnet 22 to the mmf of the second magnet 26 must be substantially equal to the ratio of the reluctance along the paths 24, 25 squared to the reluctance along the paths 28, 29 squared.

In this embodiment of the invention, the above relationship is established by constructing and operating the invention symmetrically (i.e. M1=M2 and R1=R2) so that the mmf of the magnet 22 is substantially equal to the mmf of the magnet 26, the spring 10 exerts no force on the shaft 8 when the length of the gap 18 is approximately equal to the length of the gap 20, and the stiffness of the spring 10 and the operating excitation signal to the coil 32 are such that the length of the gap 18 is not allowed to become substantially disproportionate with the length of the gap 20.

Substituting the equivalences from EQ. 3 and EQ. 4 into EQ. 2, setting K6 equal to K8 and f4(P) equal to f6(P), combining like terms, and employing new constants C1 and C2 produces an equation (EQ. 7) having only constants, functions of P, and first order D and $\phi C$ terms:

$$D = C1 \times f8(P) + C2 \times \phi C \times f9(P)$$

The amount of magnetic flux established by the coil 32, $\phi C$, is a function of the magnitude of the current (I) supplied to the coil 32 and the magnetic reluctance (RC) of elements along the path 34. Therefore, $$\phi C = (C3 \times I)/RC$$

where C3 is a constant which depends on a variety of functional factors as known to those skilled in the art.

The reluctance, RC, depends upon the magnetic reluctance along the path 34. The position of slugs 36, 37 does not effect the reluctance RC. As the armature 4 is displaced, the reluctance of all of the elements, except the gaps 18, 20, remains constant. The reluctance of the gaps 18,20 is linearly proportional to the length of the gaps 18,20. Since the sum of the length of the gaps 18,20 is constant, however, the contribution to RC attributable to the gaps 18,20 is a constant. Therefore, RC is a constant. So:

$$RC = C4$$

Combining the expression for RC and C3 into a new expression results in the equation (EQ. 8):

$$\phi C = C5 \times I$$

Combining EQ. 7 with EQ. 8 and setting $C6 = C2 \times C5$ yields:

$$D = C1 \times f8(P) + C6 \times I \times f9(P)$$

which illustrates that in this embodiment of the invention, the displacement (D) of the armature 4 is proportional the amount of current (I) supplied to the coil 32. (Note that the term C1×f8(P) is not dependant upon either I or D). The gain of the system, which equals C6×f9(P), is dependant upon the position (P) of the slugs 36, 37 along the radial axes 38, 39. Altering the radial position (P) of the slugs 36, 37 alters the gain of the system.

Even though the invention is shown with a coil 32, any variable magnetic field means may be employed to displace the armature 4, including using multiple coils. The mathematical discussion, supra, illustrates that the only constraint is that the variable magnetic field affect both of the axial magnetic fields equally and oppositely. Furthermore, even though the invention illustrates a linearly proportional relationship between current and displacement of the armature 4, the invention may be practiced by establishing a linearly proportional relationship between any input signal and displacement of the armature 4, as long as there exists a linearly proportional relationship between the input signal and the amount of magnetic flux established by the signal.

The armature 4 shown in this embodiment is annular. However, any shape (including multiple armatures) having all critical surfaces facing outwardly could be used. The armature 4 can be a solid disk having the shaft 8 attached at the face 14 or the face 16.

Furthermore, even though the faces 14–17 are shown to be parallel to each other and perpendicular to the axis of displacement, the invention could employ faces which are neither parallel nor perpendicular to the axis of displacement. However, the less parallel that the faces are and the less perpendicular that the faces are to the axis of displacement, the more that the intensity of the magnetic fields must be increased in order to establish a given amount of force.

The gaps 18,20 are illustrated in this embodiment as air gaps. However, any material which allows for free displacement of the armature 4 within the housing 6 could be employed.

Since any material is magnetic to some degree, the armature 4 and the housing 6 can be composed of any material as long as the magnetic fields which are likewise employed are powerful enough to cause effective magnetic forces to exist at the armature faces 14, 16.

Although this embodiment illustrates permanent magnets 22, 26 having equal mmf, it is possible for the magnet 22 to have a different mmf than the magnet 26 as long as the differences are compensated for by adjusting the reluctances along the paths 24, 28 in order to preserve the relationship $M1/M2 = R1^2/R2^2$. In fact, the invention does not require the use of permanent magnets and any source of constant mmf axial magnetic fields may be employed, including using coils and supplying the coils with constant current. The flux conductor 30 may be eliminated if the mmf of the magnets 22, 26 is increased.

This invention may be practiced with the magnetic polarities of the magnets 22, 26 and the coil 32 reversed. The magnets 22, 26 can be mounted on the armature 4 if the mmf of the field established by the coil 32 is substantially increased.

The spring 10, which provides a counter force to the magnetic force, could be replaced by any means capable of providing a counter force to the magnetic force which is linearly proportional to the displacement of the armature 4. The counter force could even be part of a driven external device instead of being part of the linear force motor.

The number of slugs used for altering the current to displacement ratio of the linear force motor can be modified. Also, the slugs do not have to be symmetrically placed about the motor, nor do the slugs have to be variably positionable along solely a radial axis of the motor. Although slugs 36, 37 and housing 6 are shown having complementary threads for positioning of the slugs 36, 37 within the housing 6 and the coil 32, other means of variably positioning the slugs 36, 37, known to those skilled in the art, may be employed.

Although the invention has been shown and described with respect to exemplary embodiments thereof, it should be understood by those skilled in the art that various changes, omissions and additions may be made therein and thereto, without departing from the spirit and the scope of the invention.

I claim:

1. A linear force motor comprising:

a housing, having an elongated chamber therewithin;

an armature, arranged within said chamber for axial displacement therealong, having first and second exterior armature faces substantially perpendicular tot he direction of said axial displacement, wherein a first gap is formed between said first exterior armature face and a first end of said chamber and a second gap is formed between said second armature face and an other end of said chamber;

means for providing a counter force on said armature varying linearly with displacement of said armature;

a first axially magnetized permanent magnet, for establishing a first axial magnetic field passing through said first gap and said first face and for establishing a first leakage magnetic field;

a second axially magnetized permanent magnet, for establishing a second axial magnetic field passing through said second gap and said second face and for establishing a second leakage magnetic field, wherein said second axial field magnetically opposes said first axial field and wherein the ratio of the magnitude of the magnetomotive force of said second axial field of the magnitude of the magnetomotive force of said first axial field is substantially equal to the ratio of the square of magnetic reluctance experienced by said second fields to the square of magnetic reluctance experienced by said first fields;

means, responsive to an electrical signal, for providing a variable magnetic field which varies according to the magnitude of said electrical signal and which passes through said first and second gaps and said first and second armature faces; and means for variably positioning one or more ferromagnetic slugs within said leakage fields, whereby the gain of said motor varies according to the position of said slugs.

2. A linear force motor, according to claim 1, wherein said armature is annular.

3. A linear force motor, according to claim 2, wherein said armature is disk shaped.

4. A linear force motor, according to claim 3, wherein the mmf of said first magnetic field equals the mmf of said second magnetic field.

5. A linear force motor, according to claim 1, wherein said axial magnetized permanent magnets are disposed radially outward of said armature.

6. A linear force motor, according to claim 5, wherein said variable magnetic field is established by a coil.

7. A linear force motor, accordion to claim 6, wherein said coil is hollow and is disposed radially outward of said armature.

8. A linear force motor, according to claim 7, wherein sad counter force is established by a spring.

9. A linear force motor, according to claim 8, wherein said gaps contain air.

* * * * *